US005659622A

United States Patent [19]

Ashley

[11] Patent Number: 5,659,622

[45] Date of Patent: Aug. 19, 1997

[54] METHOD AND APPARATUS FOR SUPPRESSING NOISE IN A COMMUNICATION SYSTEM

[75] Inventor: James P. Ashley, Naperville, Ill.

[73] Assignee: Motorola, Inc., Schaumburg, Ill.

[21] Appl. No.: 556,358

[22] Filed: Nov. 13, 1995

[51] Int. Cl.[6] .................................... H04B 15/00

[52] U.S. Cl. .................................... 381/94; 395/2.36

[58] Field of Search .................... 381/94, 110; 395/2.35, 395/2.36

[56] References Cited

U.S. PATENT DOCUMENTS

| | | | |
|---|---|---|---|
| 4,811,404 | 3/1989 | Vilmur et al. . | |
| 5,267,322 | 11/1993 | Smith et al. | 381/94 |
| 5,475,686 | 12/1995 | Bach et al. . | |
| 5,550,924 | 8/1996 | Helf et al. | 381/94 |

OTHER PUBLICATIONS

Kleijn, Froon and Nahumi, "The RCELP Speech–Coding Algorithm", vol. 5, No. 5, Sep.–Oct. 1994, pp. 39–48.

Nahumi and Kleijn, "An Improved 8 KB/S RCELP Coder", IEEE Workshop on Speed Coding for Telecom, 1995.

Ashley, TR45.5.1.1/95.10.17.06, "EVRC Draft Standard (IS–127)".

CCITT, "General Aspects of Digital Transmission Systems; Terminal Equipments", vol. III, International Telecommunication Union, 1989, ISBN 92–61–03341–5.

Proakis and Manolakis, "Introduction to Digital Signal Processing", Macmillan Publishing Company, 1988.

*Primary Examiner*—Forester W. Isen

*Attorney, Agent, or Firm*—Richard A. Sonnentag

[57] ABSTRACT

A noise suppression system implemented in communication system provides an improved update decision during instances of sudden increase in background noise level. The noise suppression system, inter alia, generates an update by continually monitoring the deviation of spectral energy and forcing an update based on a predetermined threshold criterion. The spectral energy deviation is determined by utilizing an element which has the past values of the power spectral components exponentially weighted. The exponential weighting is a function of the current input energy, which means the higher the input signal energy the longer the exponential window. Conversely, the lower the signal energy the shorter the exponential window. The noise suppression system also inhibits a forced update during periods of continuous, non-stationary input signals (such as "music-on-hold").

29 Claims, 10 Drawing Sheets

METHOD AND APPARATUS FOR SUPPRESSING NOISE IN A COMMUNICATION SYSTEM

FIELD OF THE INVENTION

The present invention relates generally to noise suppression and, more particularly, to noise suppression in a communication system.

BACKGROUND OF THE INVENTION

Noise suppression techniques in a communication systems are well known. The goal of a noise suppression system is to reduce the amount of background noise during speech coding so that the overall quality of the coded speech signal of the user is improved. Communication systems which implement speech coding include, but are not limited to, voice mail systems, cellular radiotelephone systems, trunked communication systems, airline communication systems, etc.

One noise suppression technique which has been implemented in cellular radiotelephone systems is spectral subtraction. In this approach, the audio input is divided into individual spectral bands (channel) by a suitable spectral divider and the individual spectral channels are then attenuated according to the noise energy content of each channel. The spectral subtraction approach utilizes an estimate of the background noise power spectral density to generate a signal-to-noise ratio (SNR) of the speech in each channel, which in turn is used to compute a gain factor for each individual channel. The gain factor is then used as an input to modify the channel gain for each of the individual spectral channels. The channels are then recombined to produce the noise-suppressed output waveform. An example of the spectral subtraction approach implemented in an analog cellular radiotelephone system is found in U.S. Pat. No. 4,811,404 to Vilmur, assigned to the assignee of the present application.

As stated in the aforementioned U.S. Patent, the prior art techniques of noise suppression suffer when a sudden, strong increase in background noise level occurs. To overcome the deficiencies in the prior art, the aforementioned U.S. Patent to Vilmur performs a forced update of the noise estimate regardless of the voice metric sum if M frames elapse without a background noise estimate update, where M is recommended in Vilmur to be between 50 and 300. Since a frame in Vilmur is 10 milliseconds (ms), and M is assumed to be 100, an update would occur at least once every second regardless of the voice metric sum, VMSUM (i.e., whether an update is needed or not).

To force an update of the noise estimate regardless of the voice metric can result in an attenuation of the user's speech signal despite the fact that no additional background noise is added. This in turn results in a degradation in audio quality as perceived by the end user. Furthermore, input signals other than a user's speech signal (for example, "music-on-hold") can cause problems in that the forced update of the noise estimate can occur over continuous intervals. This is due to the fact that music can span several seconds (or minutes) without sufficient pauses that would allow a normal update of the background noise estimate. The prior art would, therefore, allow a forced update every M frames because there is no mechanism to differentiate background noise from non-stationary input signals. This invalid forced update not only attenuates the input signal, but also causes severe distortion since the spectral estimate is being updated based on a time-varying, non-stationary input.

Thus, a need exists for a more accurate and reliable noise suppression system for use in communication systems.

DETAILED DESCRIPTION OF A PREFERRED EMBODIMENT

Figure 1:
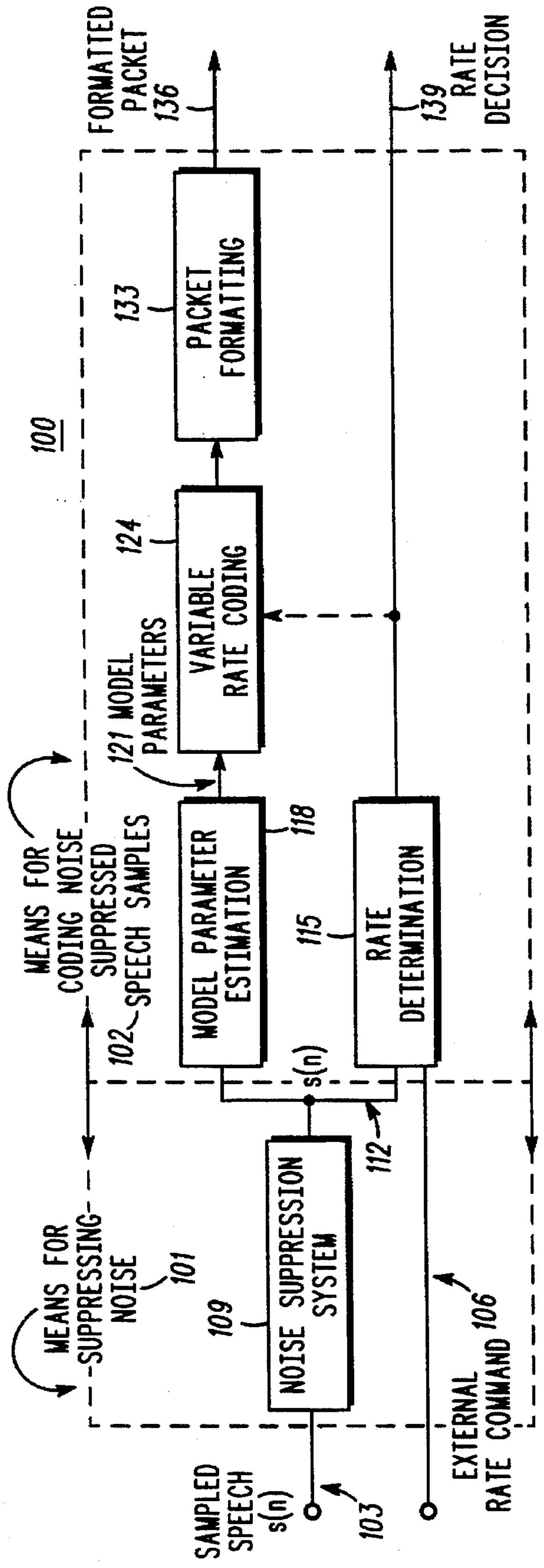
FIG. 1 generally depicts a block diagram of a speech coder for use in a communication system.

A noise suppression system implemented in a communication system provides an improved update decision during instances of sudden increase in background noise level. The noise suppression system generates, inter alia, an update by continually monitoring the deviation of spectral energy and forcing an update based on a predetermined threshold criterion. The spectral energy deviation is determined by utilizing an element which has the past values of the power spectral components exponentially weighted. The exponential weighting is a function of the current input energy, which means the higher the input signal energy the longer the exponential window. Conversely, the lower the signal energy the shorter the exponential window. Thereby, the noise suppression system inhibits a forced update during periods of continuous, non-stationary input signals (such as "music-on-hold").

Stated generally, a speech coder implements a noise suppression system in a communication system. The communication system transfers speech samples by using flames of information in channels, where the flames of information in channels have noise therein. The speech coder has as an input the speech samples, and a means for suppressing the noise based on a deviation in spectral energy between a current frame of speech samples and an average spectral energy of a plurality of past flames of speech samples to produce noise suppressed speech samples suppresses the noise in the frame of speech samples. A means for coding the noise suppressed speech samples then codes the noise suppressed speech samples for transfer by the communication system. In the preferred embodiment, the speech coder resides in either a centralized base station controller (CBSC), or a mobile station (MS) of a communication system. However, in alternate embodiments, the speech coder may reside in either a mobile switching center (MSC) or a base transceiver station (BTS). Also in the preferred embodiment, the speech coder is implemented in a code division multiple access (CDMA) communication system, but one of ordinary skill in the art will appreciate that the speech coder and noise suppression system in accordance with the invention has application to many different types of communication system.

In the preferred embodiment, the means for suppressing the noise in a frame of speech samples includes a means for estimating a total channel energy within a current frame of speech samples based on the estimate of the channel energy and a means for estimating a power of a spectra of the current frame of speech samples based on the estimate of the channel energy. Also included is a means for estimating a power of a spectra of a plurality of past frames of speech samples based on the estimate of the power of the spectra of the current frame. With this information, a means for determining a deviation between the estimate of the spectra of the current frame and the estimate of the power of the spectra of the plurality of past frames determines a spectral deviation as stated, and a means for updating the noise estimate of the channel based on the estimate of the total channel energy and the determined deviation. Based on the update of the noise estimate, a means for modifying a gain of the channel modifies the gain of the channel to produce the noise suppressed speech samples.

In the preferred embodiment, the means for estimating a power of a spectra of a plurality of past frames of information further comprises means for estimating a power of a spectra of a plurality of past frames based on an exponential weighting of the past frames of information, where the exponential weighting of the past frames of information is a function of the estimate of the total channel energy within a current frame of information. Also in the preferred embodiment, the means for updating the noise estimate of the channel based on the estimate of the total channel energy and the determined deviation further comprises means for updating the noise estimate of the channel based on a comparison of the estimate of the total channel energy with a first threshold and a comparison of the determined deviation with a second threshold. More specifically, the means for updating the noise estimate of the channel based on a comparison of the estimate of the total channel energy with a first threshold and a comparison of the determined deviation with a second threshold further comprises means for updating the noise estimate of the channel when the estimate of the total channel energy is greater than the first threshold for a first predetermined number of frames without a second predetermined number of consecutive frames having the estimate of the total channel energy less than or equal to the first threshold, and when the determined deviation is below the second threshold. In the preferred embodiment, the first predetermined number of frames is 50 frames while the second predetermined number of consecutive frames is six frames.

FIG. 1 generally depicts a block diagram of a speech coder 100 for use in a communication system. In the preferred embodiment, the speech coder 100 is a variable rate speech coder 100 suitable for suppressing noise in a code division multiple access (CDMA) communication system compatible with Interim Standard (IS) 95. For more information on IS-95, see TIA/EIA/IS-95 *Mobile Station-Base Station Compatibility Standard for Dual Mode Wideband Spread Spectrum Cellular System*, July 1993, incorporated herein by reference. Also in the preferred embodiment, the variable rate speech coder 100 supports three of the four bit rates permitted by IS-95: full-rate ("rate 1" - 170 bits/frame), ½ rate ("rate ½" - 80 bits/frame), and ⅛ rate ("rate ⅛" - 16 bits/frame). As one of ordinary skill in the art will appreciate, the embodiment described hereinafter is for example only; the speech coder 100 is compatible with many different types communication systems.

Referring to FIG. 1, the means for coding noise suppressed speech samples 102 is based on the Residual Code-Excited Linear Prediction (RCELP) algorithm which is well known in the art. For more information on the RCELP algorithm, see W. B. Kleijn, P. Kroon, and D. Nahumi, "The RCELP Speech-Coding Algorithm", European Transactions on Telecommunications, Vol. 5, Number 5. September/October 1994, pp 573–582. For more information on a RCELP algorithm appropriately modified for variable rate operation and for robustness in a CDMA environment, see D. Nahumi and W. B. Kleijn, "An Improved 8 kb/s RCELP coder", Proc. ICASSP 1995. RCELP is a generalization of the Code-Excited Linear Prediction (CELP) algorithm. For more information on the CELP algorithm, see B. S. Atal and M. R. Schroeder, "Stochastic coding of speech at very low bit rates", Proc Int. Conf. Comm., Amsterdam, 1984, pp 1610–1613. Each of the above references are incorporated herein by reference.

While the above references provide a thorough understanding of the CELP/RCELP algorithms, a brief description of the operation of the RCELP algorithm is instructive. Unlike CELP coders, RCELP does not attempt to match the original user's speech signal exactly. Instead, RCELP matches a "time-warped" version of the original residual that conforms to a simplified pitch contour of the user's speech signal. The pitch contour of the user's speech signal is obtained by estimating the pitch delay once in each frame, and linearly interpolating the pitch from frame-to-frame. One benefit of using this simplified pitch representation is that more bits are available in each frame for stochastic excitation and channel impairment protection than would be if a traditional fractional pitch approach were used. This results in enhanced frame error performance without impacting perceived speech quality in dear channel conditions.

Referring to FIG. 1, inputs to the speech coder 100 are a speech signal vector, s(n) 103, and an external rate command signal 106. The speech signal vector 103 may be created from an analog input by sampling at a rate of 8000 samples/see, and linearly (uniformly) quantizing the resulting speech samples with at least 13 bits of dynamic range. Alternatively, the speech signal vector 103 may be created from 8-bit μlaw input by converting to a uniform pulse code modulated (PCM) format according to Table 2 in ITU-T Recommendation G.711. The external rate command signal 106 may direct the coder to produce a blank packet or other than a rate 1 packet. If an external rate command signal 106 is received, that signal 106 supersedes the internal rate selection mechanism of the speech coder 100.

The input speech vector 103 is presented to means for suppressing noise 101, which in the preferred embodiment is the noise suppression system 109. The noise suppression system 109 performs noise suppression in accordance with the invention. A noise suppressed speech vector, s'(n) 112, is then presented to both a rate determination module 115 and a model parameter estimation module 118. The rate determination module 115 applies a voice activity detection (VAD) algorithm and rate selection logic to determine the type of packet (rate ⅛, ½ or 1) to generate. The model parameter estimation module 118 performs a linear predictive coding (LPC) analysis to produce the model parameters 121. The model parameters include a set of linear prediction coefficients (LPCs) and an optimal pitch delay (t). The model parameter estimation module 118 also converts the LPCs to line spectral pairs (LSPs) and calculates long and short-term prediction gains.

The model parameters 121 are input into a variable rate coding module 124 characterizes the excitation signal and quantizes the model parameters 121 in a manner appropriate to the selected rate. The rate information is obtained from a rate decision signal 139 which is also input into the variable rate coding module 124. If rate ⅛ is selected, the variable rate coding module 124 will not attempt to characterize any periodicity in the speech residual, but will instead simply characterize its energy contour. For rates ½ and rate 1, the variable rate coding module 124 will apply the RCELP algorithm to match a time-warped version of the original user's speech signal residual. After coding, a packet formatting module 133 accepts all of the parameters calculated and/or quantized in the variable rate coding module 124, and formats a packet 136 appropriate to the selected rate. The formatted packet 136 is then presented to a multiplex sub-layer for further processing, as is the rate decision signal 139. For further details on the overall operation of the speech coder 100, see IS-127 document "EVRC Draft Standard (IS-127)", edit version 1, contribution number TR45.5.1.1/95.10.17.06, 17 Oct. 1995, incorporated herein by reference.

Figure 2:
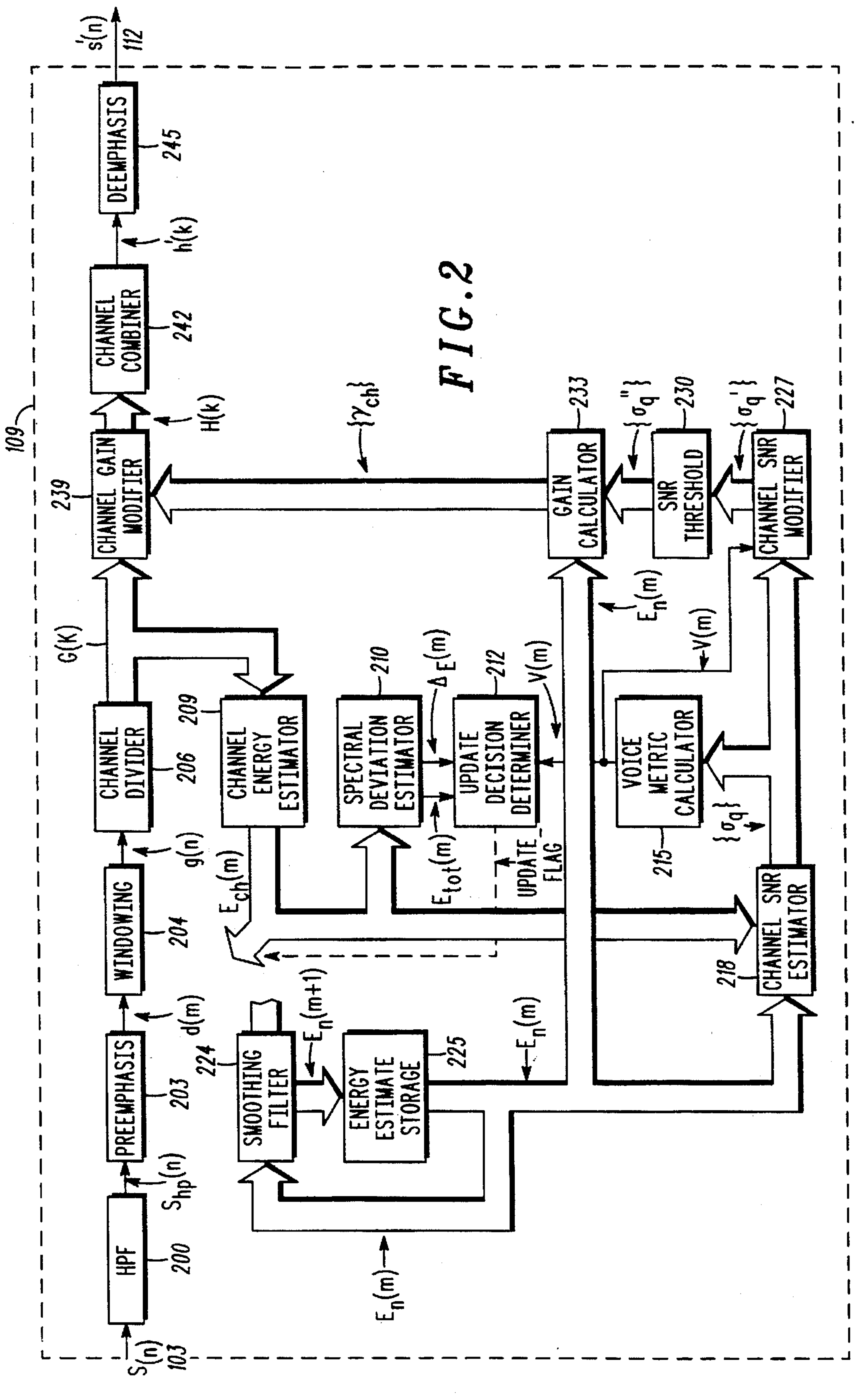
FIG. 2 generally depicts a block diagram of a noise suppression system in accordance with the invention.

FIG. 2 generally depicts a block diagram of an improved noise suppression system 109 in accordance with the invention. In the preferred embodiment, the noise suppression system 109 is used to improve the signal quality that is presented to the model parameter estimation module 118 and the rate determination module 115 of the speech coder 100. However, the operation of the noise suppression system 109 is generic in that it is capable of operating with any type of speech coder a design engineer may wish to implement in a particular communication system. It is noted that several blocks depicted in FIG. 2 of the present application have similar operation as corresponding blocks depicted in FIG. 1 of U.S. Pat. No. 4,811,404 to Vilmur. As such, U.S. Pat. No. 4,811,404 to Vilmur, assigned to the assignee of the present application, is incorporated herein by reference.

The noise suppression system 109 comprises a high pass filter (HPF) 200 and remaining noise suppressor circuitry. The output of the HPF 200 $s_{hp}(n)$ is used as input to the remaining noise suppressor circuitry. Although the frame size of the speech coder is 20 ms (as defined by IS-95), a frame size to the remaining noise suppressor circuitry is 10 ms. Consequently, in the preferred embodiment, the steps to perform noise suppression in accordance with the invention are executed two times per 20 ms speech frame.

To begin noise suppression in accordance with the invention, the input signal s(n) is high pass filtered by high pass filter (HPF) 200 to produce the signal $s_{hp}(n)$. The HPF 200 is a fourth order Chebyshev type II with a cutoff frequency of 120 Hz which is well known in the art. The transfer function of the HPF 200 is defined as:

$$H_{hp}(z)=\frac{\sum_{i=0}^{4} b(i)z^{-i}}{\sum_{i=0}^{4} a(i)z^{-i}},$$

where the respective numerator and denominator coefficients are defined to be:

b={0.898025036, −3.59010601, 5.38416243, −3.59010601, 0.898024917}, a={1.0, −3.78284979, 5.37379122, −3.39733505, 0.806448996}.

As one of ordinary skill in the art will appreciate, any number of high pass filter configurations may be employed.

Figure 3:
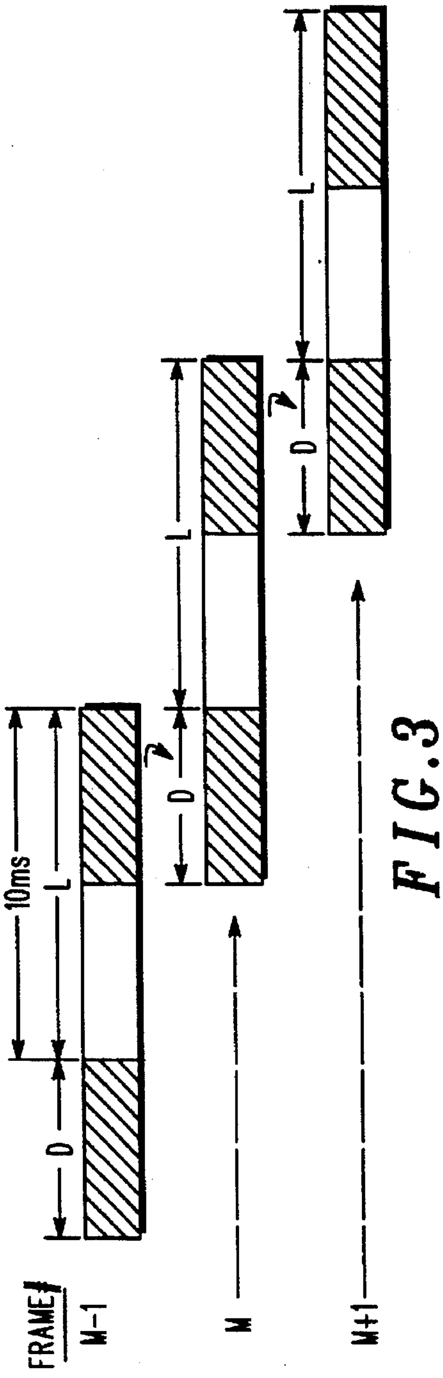
FIG. 3 generally depicts frame-to-frame overlap which occurs in the noise suppression system in accordance with the invention.

Next, in the preemphasis block 203, the signal $s_{hp}(n)$ is windowed using a smoothed trapezoid window, in which the first D samples d(m) of the input frame (frame "m") are overlapped from the last D samples of the previous frame (frame "m−1"). This overlap is best seen in FIG. 3. Unless otherwise noted, all variables have initial values of zero, e.g., d(m)=0; m≦0. This can be described as:

$$d(m,n)=d(m-1,L+n);\ 0\leq n<D$$

where m is the current frame, n is a sample index to the buffer {d(m)}, L=80 is the frame length, and D=24 is the overlap (or delay) in samples. The remaining samples of the input buffer are then preemphasized according to the following:

$$d(m,D+n)=s_{hp}(n)+\zeta_p s_{hp}(n-1);\ 0\leq n<L,$$

where $\zeta_p=-0.8$ is the preemphasis factor. This results in the input buffer containing L+D=104 samples in which the first D samples are the preemphasized overlap from the previous frame, and the following L samples are input from the current frame.

Figure 4:
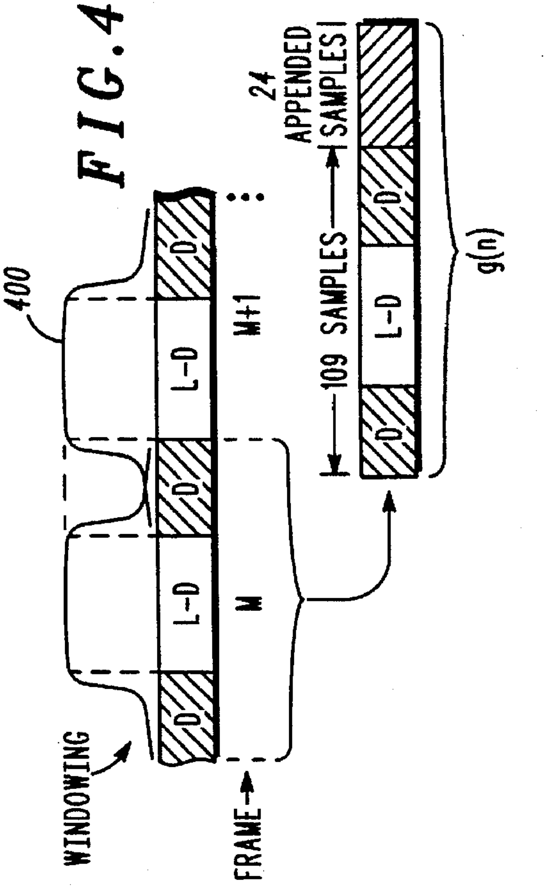
FIG. 4 generally depicts trapezoidal windowing of preemphasized samples which occurs in the noise suppression system in accordance with the invention.

Next, in the windowing block 204 of FIG. 2, a smoothed trapezoid window 400 (FIG. 4) is applied to the samples to form a Discrete Fourier Transform (DFT) input signal g(n). In the preferred embodiment, g(n) is defined as:

$$g(n)=\begin{cases} d(m,n)\sin^2(\pi(n+0.5)/2D) & ;0\leq n<D,\\ d(m,n) & ;D\leq n<L,\\ d(m,n)\sin^2(\pi(n-L+D+0.5)/2D) & ;L\leq n<D+L,\\ 0 & ;D+L\leq n<M,\end{cases}$$

where M=128 is the DFT sequence length and all other terms are previously defined.

In the channel divider 206 of FIG. 2, the transformation of g(n) to the frequency domain is performed using the Discrete Fourier Transform (DFT) defined as:

$$G(k)=\frac{2}{M}\sum_{n=0}^{M-1} g(n)e^{-j2\pi nk/M};$$

$$0\leq k<M,$$

where $e^{j\omega}$ is a unit amplitude complex phasor with instantaneous radial position ω. This is an atypical definition, but one that exploits the efficiencies of the complex Fast Fourier Transform (FFT). The 2/M scale factor results from preconditioning the M point real sequence to form an M/2 point complex sequence that is transformed using an M/2 point complex FFT. In the preferred embodiment, the signal G(k) comprises 65 unique channels. Details on this technique can be found in Proakis and Manolakis, *Introduction to Digital Signal Processing,* 2nd Edition, New York, Macmillan, 1988, pp. 721–722.

The signal G(k) is then input to the channel energy estimator 109 where the channel energy estimate $E_{ch}(m)$ for the current frame, m, is determined using the following:

$$E_{ch}(m,i)=\max\left\{E_{min},\ \alpha_{ch}(m)E_{ch}(m-1,i)+(1-\alpha_{ch}(m))\frac{1}{f_H(i)-f_L(i)+1}\sum_{k=f_L(i)}^{f_H(i)}|G(k)|^2\right\};$$

$$0\leqq i<N_c,$$

where $E_{min}$=0.0625 is the minimum allowable channel energy, $\alpha_{ch}(m)$ is the channel energy smoothing factor (defined below), $N_c$=16 is the number of combined channels, and $f_L(i)$ and $f_H(i)$ are the $i^{th}$ elements of the respective low and high channel combining tables, $f_L$ and $f_H$. In the preferred embodiment, $f_L$ and $f_H$ are defined as:

$f_L$={2, 4, 6, 8, 10, 12, 14, 17, 20, 23, 27, 31, 36, 42, 49, 56}, $f_H$={3, 5, 7, 9, 11, 13, 16, 19, 22, 26, 30, 35, 41, 48, 55, 63}.

The channel energy smoothing factor, $\alpha_{ch}(m)$, can be defined as:

$$\alpha_{ch}(m)=\begin{cases}0 & ;m\leqq 1,\\ 0.45 & ;m>1.\end{cases}$$

which means that $\alpha_{ch}(m)$ assumes a value of zero for the first frame (m=1) and a value of 0.45 for all subsequent flames. This allows the channel energy estimate to be initialized to the unfiltered channel energy of the first frame. In addition, the channel noise energy estimate (as defined below) should be initialized to the channel energy of the first frame, i.e.:

$$E_n(m,i)=\max\{E_{init},\ E_{ch}(m,i)\};\ m=1,\ 0\leqq i<N_c,$$

where $E_{init}$=16 is the minimum allowable channel noise initialization energy.

The channel energy estimate $E_{ch}(m)$ for the current frame is next used to estimate the quantized channel signal-to-noise ratio (SNR) indices. This estimate is performed in the channel SNR estimator 218 of FIG. 2, and is determined as:

$$\sigma_q(i)=\max\left\{0,\min\left\{89,\mathrm{round}\left\{10\log_{10}\left(\frac{E_{ch}(m,i)}{E_n(m,i)}\right)/0.375\right\}\right\}\right\};$$

$$0\leqq i<N_c,$$

where $E_n(m)$ is the current channel noise energy estimate (as defined later), and the values of $\{\sigma_q\}$ are constrained to be between 0 and 89, inclusive.

Using the channel SNR estimate $\{\sigma_q\}$, the sum of the voice metrics is determined in the voice metric calculator 215 using:

$$v(m)=\sum_{i=0}^{N_c-1}V(\sigma_q(i))$$

where V(k) is the $k^{th}$ value of the 90 element voice metric table V, which is defined as:

V={2, 2, 2, 2, 2, 2, 2, 2, 2, 2, 2, 3, 3, 3, 3, 3, 4, 4, 4, 5, 5, 5, 6, 6, 7, 7, 7, 8, 8, 9, 9, 10, 10, 11, 12, 12, 13, 13, 14, 15, 15, 16, 17, 17, 18, 19, 20, 20, 21, 22, 23, 24, 24, 25, 26, 27, 28, 28, 29, 30, 31, 32, 33, 34, 35, 36, 37, 37, 38, 39, 40, 41, 42, 43, 44, 45, 46, 47, 48, 49, 50, 50, 50, 50, 50, 50, 50, 50, 50, 50}.

Figure 5:
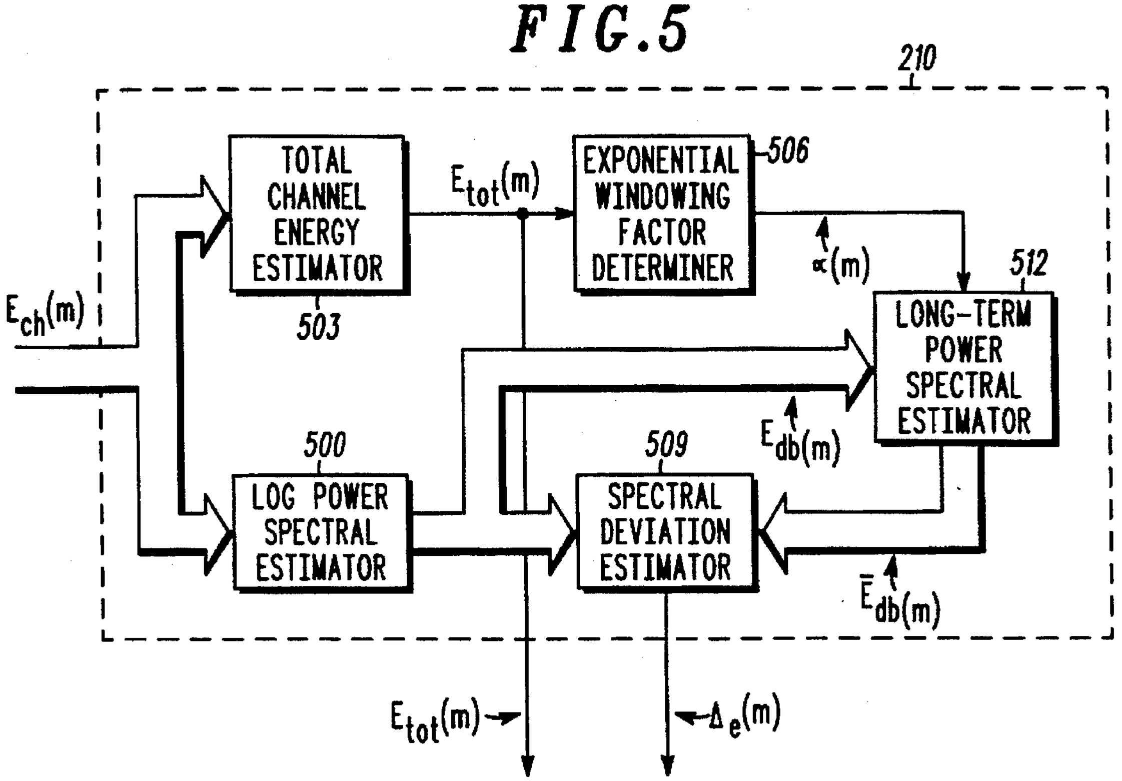
FIG. 5 generally depicts a block diagram of the spectral deviation estimator depicted in FIG. 2 and used in the noise suppression system in accordance with the invention.

The channel energy estimate $E_{ch}(m)$ for the current frame is also used as input to the spectral deviation estimator 210, which estimates the spectral deviation $\Delta_E(m)$. With reference to FIG. 5, the channel energy estimate $E_{ch}(m)$ is input into a log power spectral estimator 500, where the log power spectra is estimated as:

$$E_{dB}(m,i)=10\log_{10}(E_{ch}(m,i));\ 0\leqq i<N_c.$$

The channel energy estimate $E_{ch}(m)$ for the current frame is also input into a total channel energy estimator 503, to determine the total channel energy estimate, $E_{tot}(m)$, for the current frame, m, according to the following:

$$E_{tot}(m)=10\log_{10}\left(\sum_{i=0}^{N_c-1}E_{ch}(m,i)\right).$$

Next, an exponential windowing factor, $\alpha(m)$ (as a function of total channel energy $E_{tot}(m)$) is determined in the exponential windowing factor determiner 506 using:

$$\alpha(m)=\alpha_H-\left(\frac{\alpha_H-\alpha_L}{E_H-E_L}\right)(E_H-E_{tot}(m)),$$

which is limited between $\alpha_H$ and $\alpha_L$ by:

$$\alpha(m)=\max\{\alpha_L,\ \min\{\alpha_H,\ \alpha(m)\}\},$$

where $E_H$ and $E_L$ are the energy endpoints (in decibels, or "dB") for the linear interpolation of $E_{tot}(m)$, that is transformed to $\alpha(m)$ which has the limits $\alpha_L\leqq\alpha(m)\leqq\alpha_H$. The values of these constants are defined as: $E_H$=50, $E_L$=30, $\alpha_H$=0.99, $\alpha_L$=0.50. Given this, a signal with relative energy of, say, 40 dB would use an exponential windowing factor of $\alpha(m)$=0.745 using the above calculation.

The spectral deviation $\Delta_E(m)$ is then estimated in the spectral deviation estimator 509. The spectral deviation $\Delta_E(m)$ is the difference between the current power spectrum and an averaged long-term power spectral estimate:

$$\Delta_E(m)=\sum_{i=0}^{N_c-1}|E_{dB}(m,i)-\bar{E}_{dB}(m,i)|,$$

where $\bar{E}_{dB}(m)$ is the averaged long-term power spectral estimate, which is determined in the long-term spectral energy estimator 512 using:

$$\bar{E}_{dB}(m+1,i)=\alpha(m)\bar{E}_{dB}(m,i)+(1-\alpha(m))E_{dB}(m,i);\ 0\leqq i<N_c,$$

where all the variables are previously defined. The initial value of $\bar{E}_{dB}(m)$ is defined to be the estimated log power spectra of frame 1, or:

$$\bar{E}_{dB}(m)=E_{dB}(m);\ m=1.$$

At this point, the sum of the voice metrics v(m), the total channel energy estimate for the current frame $E_{tot}(m)$ and the spectral deviation $\Delta_E(m)$ are input into the update decision determiner 212 to facilitate noise suppression in accordance with the invention. The decision logic, shown below in pseudo-code and depicted in flow diagram form in FIG. 6, demonstrates how the noise estimate update decision is ultimately made. The process starts at step 600 and proceeds to step 603, where the update flag (update_flag) is cleared. Then, at step 604, the update logic (VMSUM only) of Vilmur is implemented by checking whether the sum of the voice metrics v(m) is less than an update threshold (UPDATE_THLD). If the sum of the voice metric is less than the update threshold, the update counter (update_cnt) is cleared at step 605, and the update flag is set at step 606. The pseudo-code for steps 603–606 is shown below:

```
update_flag = FALSE;
if (v(m) ≦ UPDATE_THLD){
        update_flag = TRUE
        update_cnt = 0
}
```

If the sum of the voice metric is greater than the update threshold at step 604, noise suppression in accordance with the invention is implemented. First, at step 607, the total channel energy estimate, $E_{tot}(m)$, for the current frame, m, is compared with the noise floor in dB (NOISE_FLOOR_DB) while the spectral deviation $\Delta_E(m)$ is compared with the deviation threshold (DEV_THLD). If the total channel energy estimate is greater than the noise floor and the spectral deviation is less than the deviation threshold, the update counter is incremented at step 608. After the update counter has been incremented, a test is performed at step 609 to determine whether the update counter is greater than or equal to an update counter threshold (UPDATE_CNT_THLD). If the result of the test at step 609 is true, then the update flag is set at step 606. The pseudo-code for steps 607–609 and 606 is shown below:

```
else if ((E_tot(m) > NOISE_FLOOR_DB) and (Δ_E(m) <DEV_THLD)){
    update_cnt = update_cnt + 1
    if (update_cnt ≦ UPDATE_CNT_THLD)
        update_flag = TRUE
}
```

Figure 6:
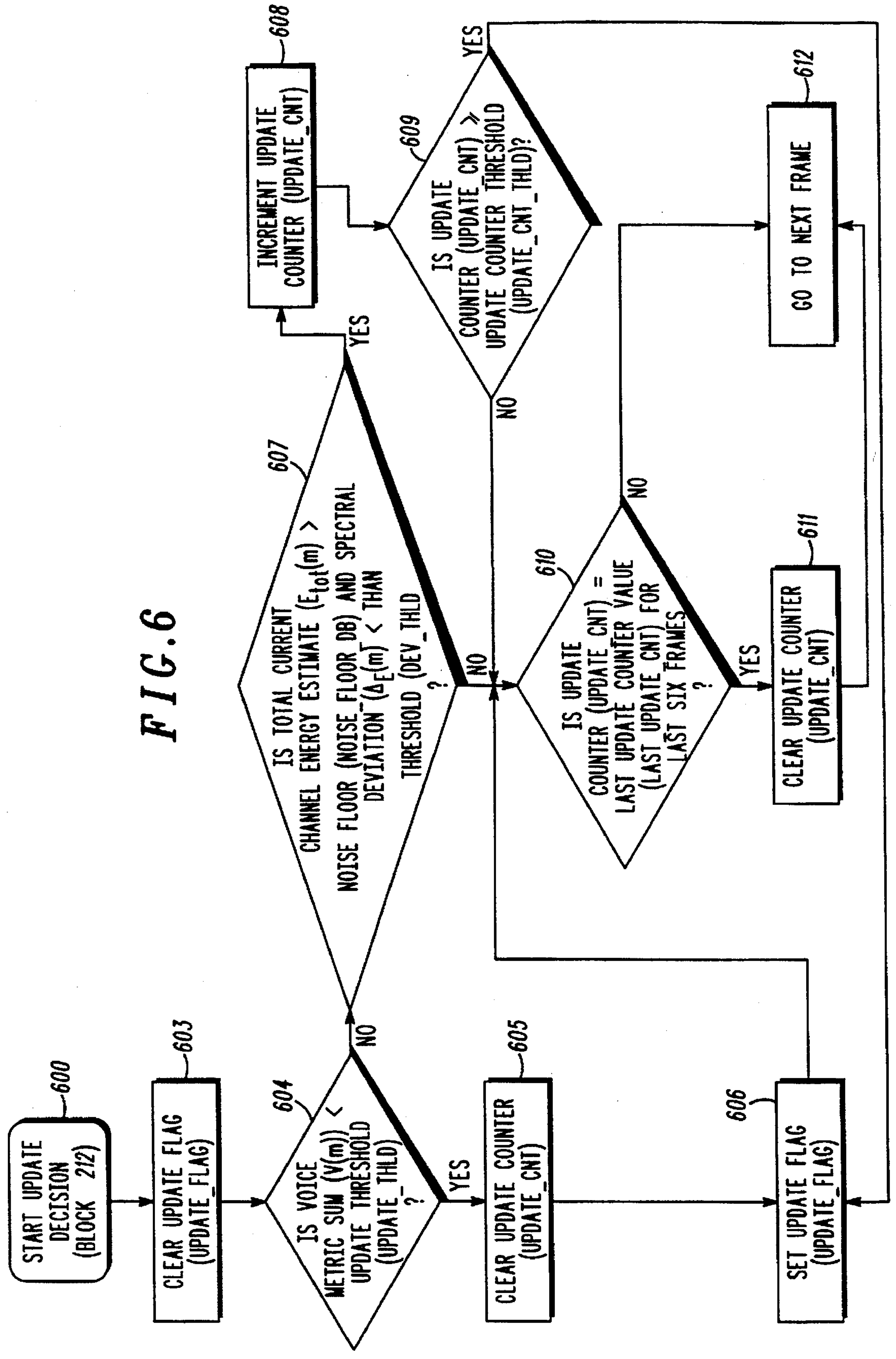
FIG. 6 generally depicts a flow diagram of the steps performed in the update decision determiner depicted in FIG. 2 and used in the noise suppression in accordance with the invention.

As can be seen from FIG. 6, if either of the tests at steps 607 and 609 are false, or after the update flag has been set at step 606, logic to prevent long-term "creeping" of the update counter is implemented. This hysteresis logic is implemented to prevent minimal spectral deviations from accumulating over long periods, causing an invalid forced update. The process starts at step 610 where a test is performed to determine whether the update counter has been equal to the last update counter value (last_update_cnt) for the last six frames (HYSTER_CNT_THLD). In the preferred embodiment, six frames are used as a threshold, but any number of frames may be implemented. If the test at step 610 is true, the update counter is cleared at step 611, and the process exits to the next frame at step 612. If the test at step 610 is false, the process exits directly to the next frame at step 612. The pseudo-code for steps 610–612 is shown below:

```
if (update_cnt == last_update_cnt)
        hyster_cnt = hyster_cnt + 1
else
        hyster_cnt = 0
last_update_cnt = update_cnt
if (hyster_cnt > HYSTER_CNT_THLD)
        update_cnt = 0.
```

In the preferred embodiment, the values of the previously used constants are as follows:

UPDATE_THLD=35,

NOISE_FLOOR_DB=10 $\log_{10}(1)$,

DEV_THLD=28,

UPDATE_CNT_THLD=50, and

HYSTER_CNT_THLD=6.

Whenever the update flag at step 606 is set for a given frame, the channel noise estimate for the next frame is updated in accordance with the invention. The channel noise estimate is updated in the smoothing filter 224 using:

$$E_n(m+1, i)=\max\{E_{min},\alpha_n E_n(m,i)+(1-\alpha_n)E_{ch}(m,i)\};\ 0\leqq i<N_c,$$

where $E_{min}$=0.0625 is the minimum allowable channel energy, and $\alpha_n$=0.9 is the channel noise smoothing factor stored locally in the smoothing filter 224. The updated channel noise estimate is stored in the energy estimate storage 225, and the output of the energy estimate storage 225 is the updated channel noise estimate $E_n(m)$. The updated channel noise estimate $E_n(m)$ is used as an input to the channel SNR estimator 218 as described above, and also the gain calculator 233 as will be described below.

Next, the noise suppression system 109 determines whether a channel SNR modification should take place. This determination is performed in the channel SNR modifier 227, which counts the number of channels which have channel SNR index values which exceed an index threshold. During the modification process itself, channel SNR modifier 227 reduces the SNR of those particular channels having an SNR index less than a setback threshold (SETBACK_THLD), or reduces the SNR of all of the channels if the sum of the voice metric is less than a metric threshold (METRIC_THLD). A pseudo-code representation of the channel SNR modification process occurring in the channel SNR modifier 227 is provided below:

```
index_cnt = 0
for (i = N_M to N_c − 1 step 1){
    if (σ_q(i) ≧ INDEX_THLD)
        index_cnt = index_cnt + 1
}
if (index_cnt < INDEX_CNT_THLD)
    modify_flag = TRUE
else
    modify_flag = FALSE
if (modify_flag == TRUE)
    for (i = 0 to N_c − 1 step 1)
        if ((v(m) ≦ METRIC_THLD) or (σ_q(i) ≦ SETBACK_THLD))
            σ_q'(i) = 1
        else
            σ_q'(i) = σ_q(i)
else
    {σ_q'} = {σ_q}
```

At this point, the channel SNR indices $\{\sigma_q'\}$ are limited to a SNR threshold in the SNR threshold block 230. The constant $\sigma_{th}$ is stored locally in the SNR threshold block 230. A pseudo-code representation of the process performed in the SNR threshold block 230 is provided below:

```
for (i = 0 to N_c − step 1)
        if (σ_q'(i) < σ_th)
            σ_q"(i) = σ_th
        else
            σ_q"(i) = σ_q'(i)
```

In the preferred embodiment, the previous constants and thresholds are given to be:

$N_M$=5,

INDEX_THLD=12,

INDEX_CNT_THLD=5,

METRIC_THLD=45,

SETBACK_THLD=12, and $\sigma_{th}$=6.

At this point, the limited SNR indices $\{\sigma_q''\}$ are input into the gain calculator 233, where the channel gains are determined. First, the overall gain factor is determined using:

$$\gamma_n = \max\left\{ \gamma_{min}, -10\log_{10}\left( \frac{1}{E_{floor}} \sum_{i=0}^{N_c-1} E_n(m,i) \right) \right\},$$

where $\gamma_{min}=-13$ is the minimum overall gain, $E_{floor}=1$ is the noise floor energy, and $E_n(m)$ is the estimated noise spectrum calculated during the previous frame. In the preferred embodiment, the constants $\gamma_{min}$ and $E_{floor}$ are stored locally in the gain calculator 233. Continuing, channel gains (in dB) are then determined using:

$$\gamma_{dB}(i)=\mu_g(\sigma_q''(i)-\sigma_{th})+\gamma_n;\ 0\leq i<N_c,$$

where $\mu_g=0.39$ is the gain slope (also stored locally in gain calculator 233). The linear channel gains are then converted using:

$$\gamma_{ch}(i)=\min\{1,\ 10^{\gamma_{dB}(i)/20}\};\ 0\leq i<N_c.$$

At this point, the channel gains determined above are applied to the transformed input signal G(k) with the following criteria to produce the output signal H(k) from the channel gain modifier 239:

$$H(k)=\begin{cases}\gamma_{ch}(i)G(k);f_L(i)\leq k\leq f_H(i),0\leq i<N_c,\\ G(k);\ \text{otherwise.}\end{cases}$$

The otherwise condition in the above equation assumes the interval of k to be $0\leq k\leq M/2$. It is further assumed that H(k) is even symmetric, so that the following condition is also imposed:

$$H(M-k)=H(k);\ 0<k<M/2.$$

The signal H(k) is then converted (back) to the time domain in the channel combiner 242 by using the inverse DFT:

$$h(m,n)=\frac{1}{2}\sum_{k=0}^{M-1}H(k)e^{j2\pi nk/M};\ 0\leq n<M,$$

and the frequency domain filtering process is completed to produce the output signal h'(n) by applying overlap-and-add with the following criteria:

$$h'(n)=\begin{cases}h(m,n)+h(m-1,n+L);0\leq n<M-L,\\ h(m,n);\ M-L\leq n<L,\end{cases}$$

Signal deemphasis is applied to the signal h'(n) by the deemphasis block 245 to produce the signal s'(n) having been noised suppressed in accordance with the invention:

$$s'(n)=h'(n)+\zeta_d s'(n-1);\ 0\leq n<L,$$

where $\zeta_d=0.8$ is a deemphasis factor stored locally within the deemphasis block 245.

Figure 7:
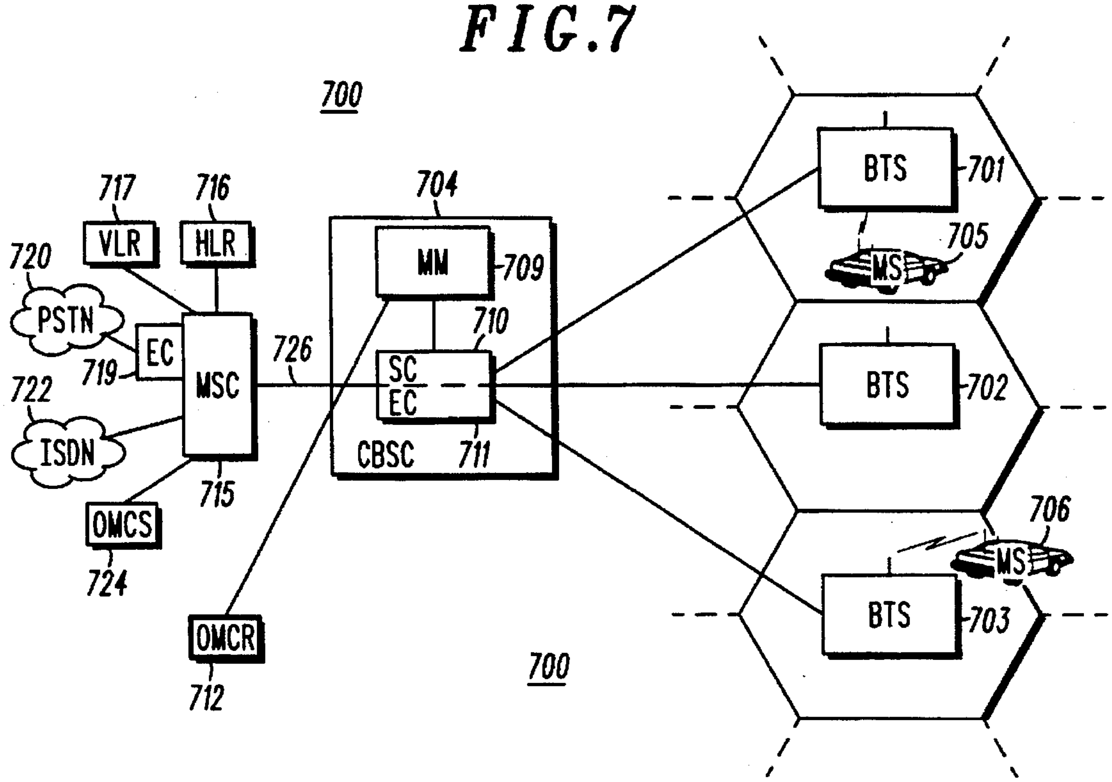
FIG. 7 generally depicts a block diagram of a communication system which may beneficially implement the noise suppression system in accordance with the invention.

FIG. 7 generally depicts a block diagram of a communication system 700 which may beneficially implement the noise suppression system in accordance with the invention. In the preferred embodiment, the communication system is a code division multiple access (CDMA) cellular radiotelephone system. As one of ordinary skill in the art will appreciate, however, the noise suppression system in accordance with the invention can be implemented in any communication system which would benefit from the system. Such systems include, but are not limited to, voice mail systems, cellular radiotelephone systems, trunked communication systems, airline communication systems, etc. Important to note is that the noise suppression system in accordance with the invention may be beneficially implemented in communication systems which do not include speech coding, for example analog cellular radiotelephone systems.

Referring to FIG. 7, acronyms are used for convenience. The following is a list of definitions for the acronyms used in FIG. 7:

| | |
|---|---|
| BTS | Base Transceiver Station |
| CBSC | Centralized Base Station Controller |
| EC | Echo Canceller |
| VLR | Visitor Location Register |
| HLR | Home Location Register |
| ISDN | Integrated Services Digital Network |
| MS | Mobile Station |
| MSC | Mobile Switching Center |
| MM | Mobility Manager |
| OMCR | Operations and Maintenance Center - Radio |
| OMCS | Operations and Maintenance Center - Switch |
| PSTN | Public Switched Telephone Network |
| TC | Transcoder |

As seen in FIG. 7, a BTS 701-703 is coupled to a CBSC 704. Each BTS 701-703 provides radio frequency (RF) communication to an MS 705-706. In the preferred embodiment, the transmitter/receiver (transceiver) hardware implemented in the BTSs 701-703 and the MSs 705-706 to support the RF communication is defined in the document titled TIA/EIA/IS-95, *Mobile Station-Base Station Compatibility Standard for Dual Mode Wideband Spread Spectrum Cellular System*, July 1993 available from the Telecommunication Industry Association (TIA). The CBSC 704 is responsible for, inter alia, call processing via the TC 710 and mobility management via the MM 709. In the preferred embodiment, the functionality of the speech coder 100 of FIG. 2 resides in the TC 704. Other tasks of the CBSC 704 include feature control and transmission/networking interfacing. For more information on the functionality of the CBSC 704, reference is made to U.S. Pat. application Ser. No. 07/997,997 to Bach et al., assigned to the assignee of the present application, and incorporated herein by reference.

Also depicted in FIG. 7 is an OMCR 712 coupled to the MM 709 of the CBSC 704. The OMCR 712 is responsible for the operations and general maintenance of the radio portion (CBSC 704 and BTS 701-703 combination) of the communication system 700. The CBSC 704 is coupled to an MSC 715 which provides switching capability between the PSTN 720/ISDN 722 and the CBSC 704. The OMCS 724 is responsible for the operations and general maintenance of the switching portion (MSC 715) of the communication system 700. The HLR 716 and VLR 717 provide the communication system 700 with user information primarily used for billing purposes. ECs 711 and 719 are implemented to improve the quality of speech signal transferred through the communication system 700.

The functionality of the CBSC 704, MSC 715, HLR 716 and VLR 717 is shown in FIG. 7 as distributed, however one of ordinary skill in the art will appreciate that the functionality could likewise be centralized into a single element. Also, for different configurations, the TC 710 could likewise be located at either the MSC 715 or a BTS 701-703. Since the functionality of the noise suppression system 109 is generic, the present invention contemplates performing noise suppression in accordance with the invention in one element (e.g., the MSC 715) while performing the speech coding function in a different element (e.g., the CBSC 704). In this embodiment, the noised suppressed signal s'(n) (or data representing the noise suppressed signal s'(n)) would be transferred from the MSC 715 to the CBSC 704 via the link 726.

In the preferred embodiment, the TC 710 performs noise suppression in accordance with the invention utilizing the noise suppression system 109 shown in FIG. 2. The link 726 coupling the MSC 715 with the CBSC 704 is a T1/E1 link which is well known in the art. By placing the TC 710 at the CBSC, a 4:1 improvement in link budget is realized due to compression of the input signal (input from the T1/E1 link 726) by the TC 710. The compressed signal is transferred to a particular BTS 701-703 for transmission to a particular MS 705-706. Important to note is that the compressed signal transferred to a particular BTS 701-703 undergoes further processing at the BTS 701-703 before transmission occurs. Put differently, the eventual signal transmitted to the MS 705-706 is different in form but the same in substance as the compressed signal exiting the TC 710. In either event the compressed signal exiting the TC 710 has undergone noise suppression in accordance with the invention using the noise suppression system 109 (as shown in FIG. 2).

When the MS 705-706 receives the signal transmitted by a BTS 701-703, the MS 705-706 will essentially "undo" (commonly referred to as "decode") all of the processing done at the BTS 701-703 and the speech coding done by the TC 710. When the MS 705-706 transmits a signal back to a BTS 701-703, the MS 705-706 likewise implements speech coding. Thus, the speech coder 100 of FIG. 1 resides at the MS 705-706 also, and as such, noise suppression in accordance with the invention is also performed by the MS 705-706. After a signal having undergone noise suppression is transmitted by the MS 705-706 (the MS also performs further processing of the signal to change the form, but not the substance, of the signal) to a BTS 701-703, the BTS 701-703 will "undo" the processing performed on the signal and transfer the resulting signal to the TC 710 for speech decoding. After speech decoding by the TC 710, the signal is transferred to an end user via the T1/E1 link 726. Since both the end user and the user in the MS 705-706 eventually receive a signal having undergone noise suppression in accordance with the invention, each user is capable of realizing the benefits provided by the noise suppression system 109 of the speech coder 100.

Figure 8:
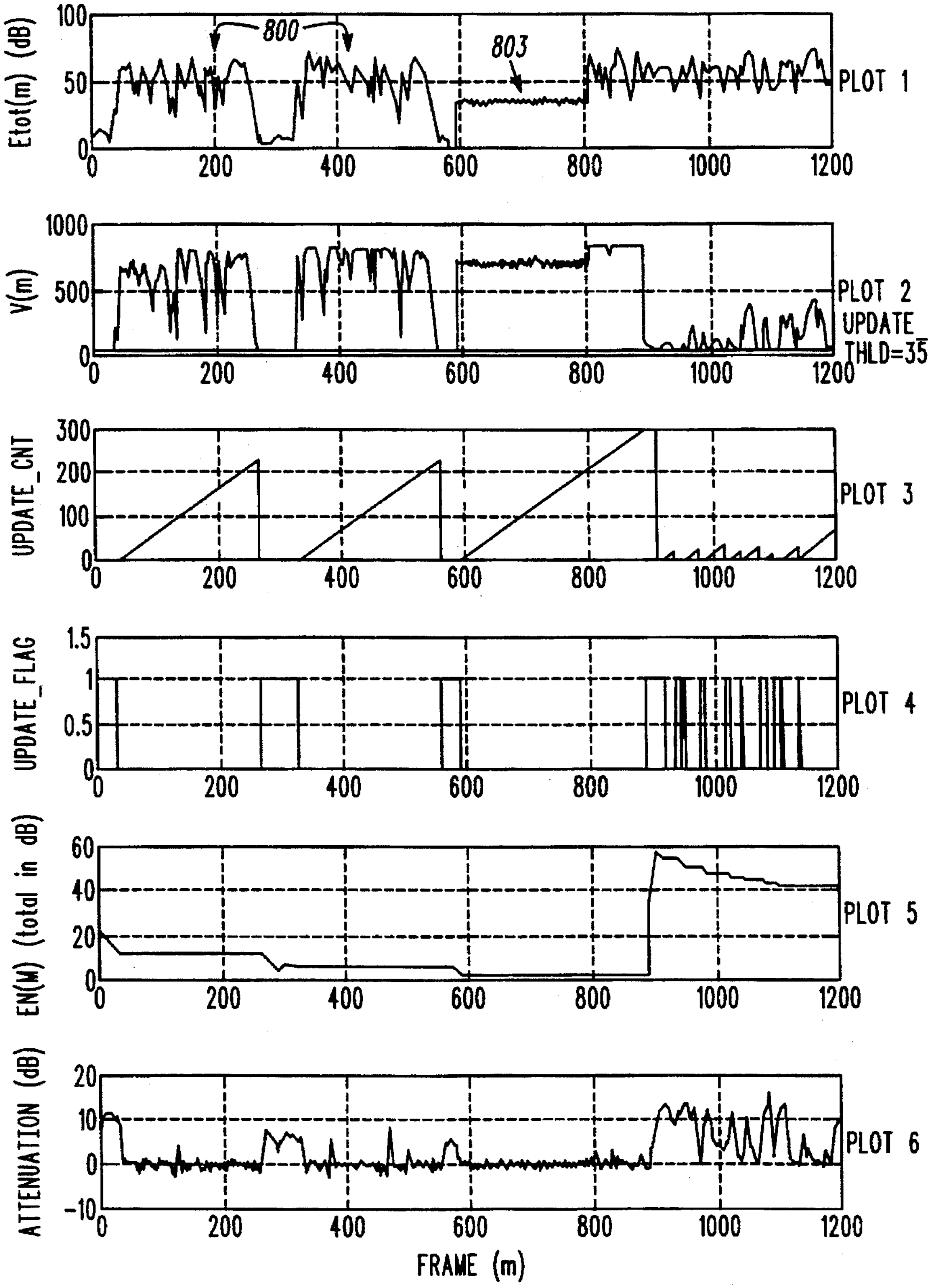
FIG. 8 generally depicts variables related to noise suppression of a voice signal as implemented by the prior art.
Figure 9:
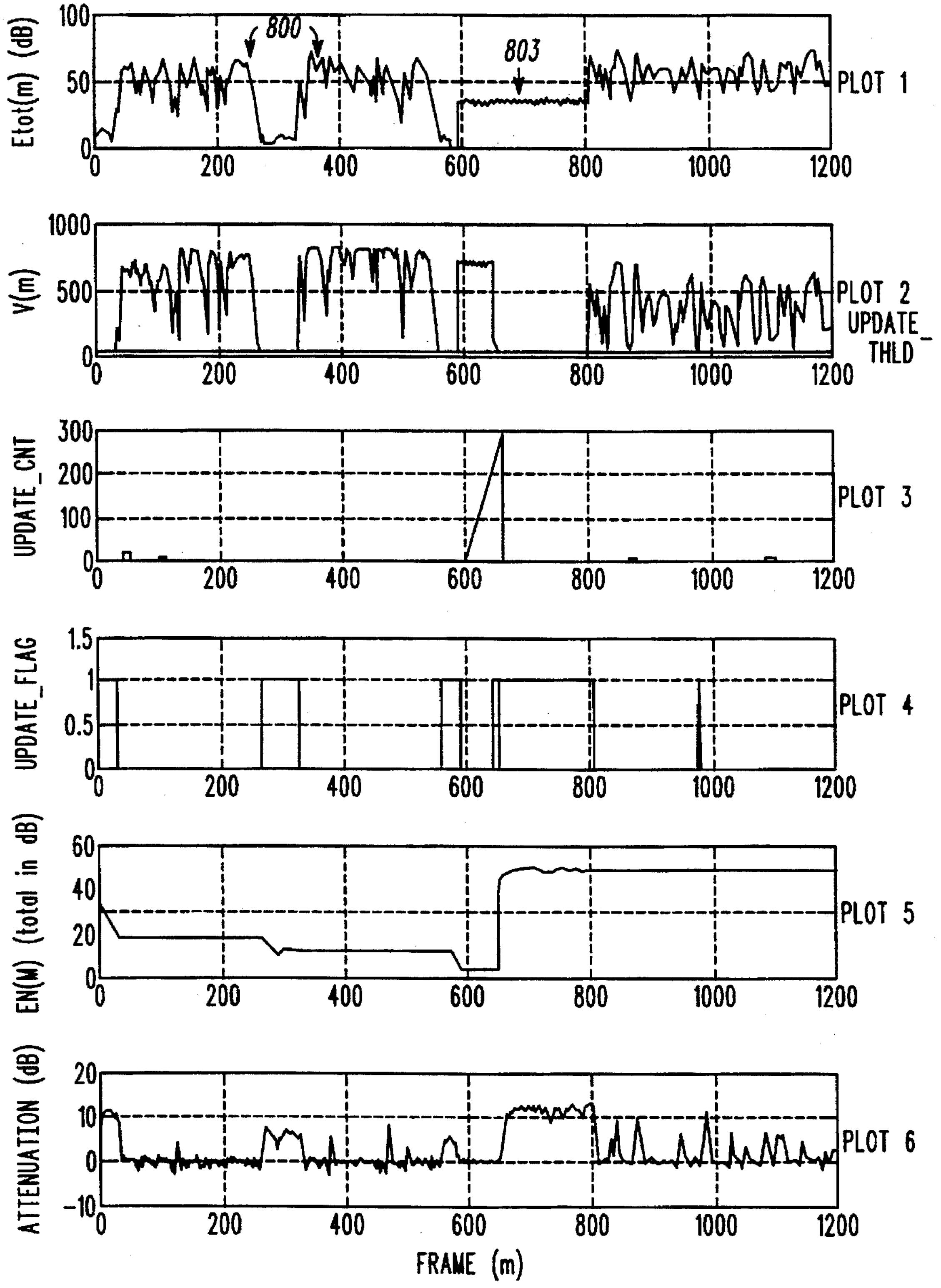
FIG. 9 generally depicts variables related to noise suppression of a voice signal as implemented by the noise suppression system in accordance with the invention.

FIG. 8 generally depicts variables related to noise suppression of a voice signal as implemented by the prior art, while FIG. 9 generally depicts variables related to noise suppression of a voice signal as implemented by the noise suppression system in accordance with the invention. Here, the various plots show the values of different state variables as a function of the frame number, m, as shown on the horizontal axis. The first plot (Plot 1) in each of FIG. 8 and FIG. 9 shows the total channel energy $E_{tot}(m)$, followed by the voice metric sum v(m), the update counter (update_cnt or TIMER in Vilmur), the update flag (update_flag), the sum of the channel noise estimates $(\Sigma E_n(m,i))$, and the estimated signal attenuation, $10 \log_{10}(E_{input}/E_{output})$, where the input is $s_{hp}(n)$ and the output is s'(n).

Referring to FIG. 8 and FIG. 9, the increase in background noise can be observed in Plot 1 just before frame 600. Prior to frame 600, the input was a "clean" (low background noise) voice signal 801. When a sudden increase in background noise 803 occurs, the voice metric sum v(m) depicted in Plot 2 is proportionally increased and the prior art noise suppression method is inferior. The ability to recover from this condition is shown in Plot 3, where the update counter (update_cnt) is allowed to increase as long as there is no update being performed. This example shows that the update counter reaches the update threshold (UPDATE_CNT_THLD) of 300 (for Vilmur) during active speech at about frame 900. At approximately frame 900, the update flag (update_flag) is set as shown in Plot 4, which results in a background noise estimate update using the active speech signal as shown in Plot 5. This can be observed as attenuation of the active speech as shown in Plot 6. Important to note is that the update of the noise estimate occurs during the speech signal (frame 900 of Plot 1 is during speech), with the effect of "bludgeoning" the speech signal when an update is unnecessary. Also, since the update count threshold is in risk of expiring during normal speech, a relatively high threshold (300) is required in an attempt to prevent such an update.

Referring to FIG. 9, the update counter is only incremented during the background noise increase, but before the speech signal begins. As such, the update threshold can be lowered to a value of 50, while still maintaining reliable updates. Here, the update counter reaches the update counter threshold (UPDATE_CNT_THLD) of 50 by frame 650, which allows the noise suppression system 109 sufficient time to converge to the new noise condition prior to the return of the speech signal at frame 800. During this time, it can be seen that the attenuation occurs only during non-speech frames thus no "bludgeoning" of the speech signal occurs. The result is an improved speech signal as heard by the end user.

The improved speech signal results from the fact that the update decision is being made based on the spectral deviation between the current frame energy and an average of past frame energy, instead of simply allowing a timer to expire in the absence of normal voice metric updates. In the latter case (like Vilmur), the system views the sudden increase in noise as a speech signal itself, thus it is incapable of distinguishing the increased background noise level from a true speech signal. By using the spectral deviation, the background noise can be distinguished from a true speech signal, and an improved update decision made accordingly.

Figure 10:
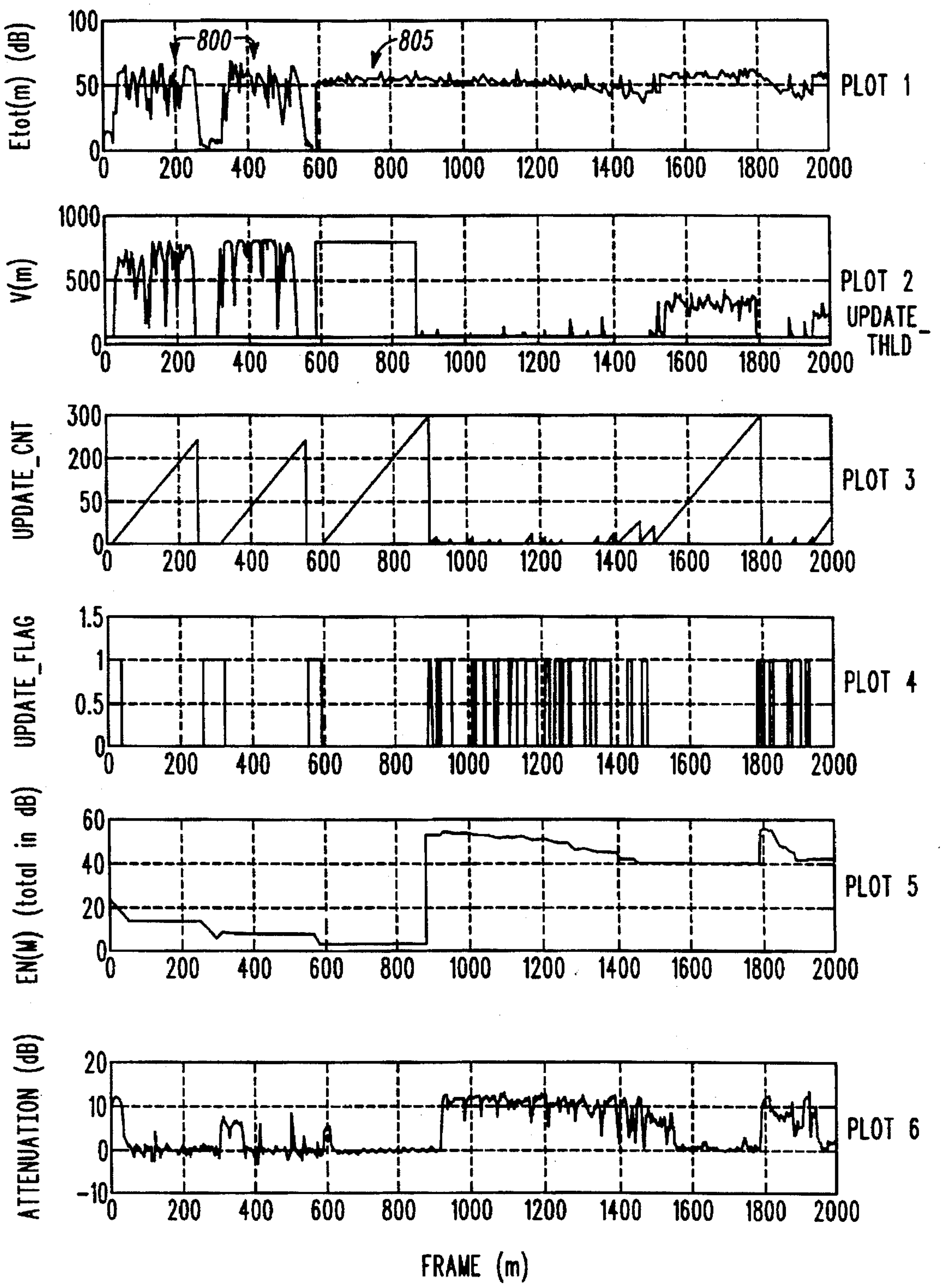
FIG. 10 generally depicts variables related to noise suppression of a music signal as implemented by the prior art.
Figure 11:
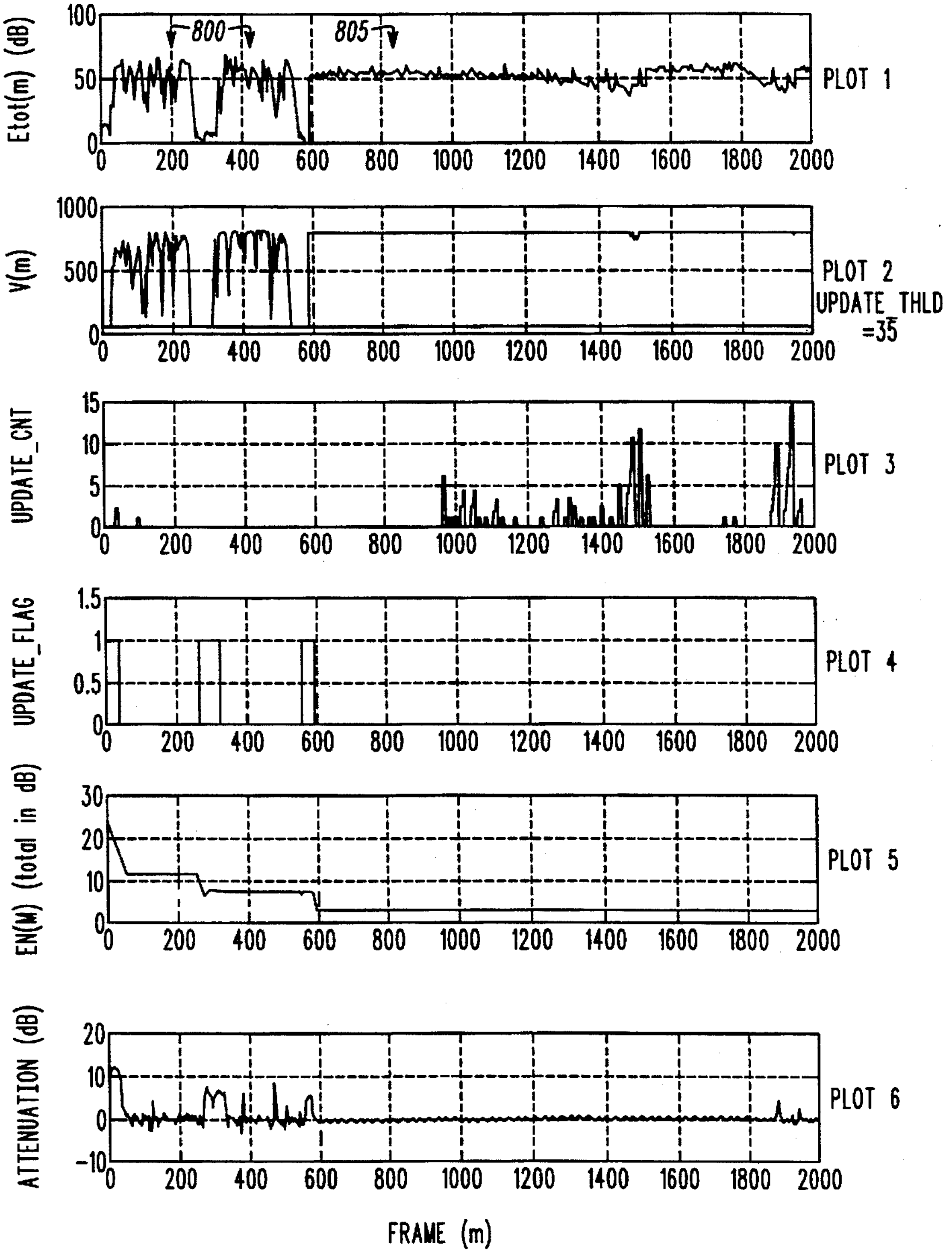
FIG. 11 generally depicts variables related to noise suppression of a music signal as implemented by the noise suppression system in accordance with the invention.

FIG. 10 generally depicts variables related to noise suppression of a music signal as implemented by the prior art, while FIG. 11 generally depicts variables related to noise suppression of a music signal as implemented by the noise suppression system in accordance with the invention. For purposes of this example, the signal up to frame 600 in FIG. 10 and FIG. 11 is the same clean signal 800 as shown in FIG. 8 and FIG. 9. Referring to FIG. 10, the prior art method behaves in much the same way as the background noise example depicted in FIG. 8. At frame 600 the music signal 805 generates a virtually continuous voice metric sum v(m) as shown in Plot 2 that is eventually overridden by the update counter (as seen in Plot 3) at frame 900. As the characteristics of the music signal 805 change over time, the attenuation shown in Plot 6 is reduced, but the update counter continually overrides the voice metric as shown at frame 1800. In contrast, and as best seen in FIG. 11, the update counter (as seen in Plot 3) never reaches a threshold (UPDATE_CNT_THLD) of 50 and thus no update occurs. The fact that no update occurs can by appreciated most with reference to Plot 6 of FIG. 11, where the attenuation of the music signal 805 is a constant 0 dB (i.e., no attenuation occurs). Thus, a user listening to music (for example, "music-on-hold") which is noise suppressed by the prior art technique would hear an undesired change in the music level while a user listening to music which is noise suppressed in accordance with the invention would hear the music at constant levels as desired.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of suppressing noise in a communication system, the communication system implementing information transfer by using frames of information in channels, the frames of information in channels having noise which results in a noise estimate of the channel, the method comprising the steps of:

estimating a channel energy within a current frame of information;

estimating a total channel energy within a current frame of information based on the estimate of the channel energy;

estimating a power of a spectra of the current frame of information based on the estimate of the channel energy;

estimating a power of a spectra of a plurality of past frames of information based on the estimate of the power of the spectra of the current frame;

determining a deviation between the estimate of the spectra of the current frame and the estimate of the power of the spectra of the plurality of past frames; and updating the noise estimate of the channel based on the estimate of the total channel energy and the determined deviation.

2. The method of claim 1, further comprising the step of modifying a gain of the channel based on the update of the noise estimate to produce a noise suppressed signal.

3. The method of claim 1, wherein the step of estimating a power of a spectra of a plurality of past frames of information further comprises the step of estimating a power of a spectra of a plurality of past frames based on an exponential weighting of the past frames of information.

4. The method of claim 3, wherein the exponential weighting of the past frames of information is a function of the estimate of the total channel energy within a current frame of information.

5. The method of claim 1, wherein the step of updating the noise estimate of the channel based on the estimate of the total channel energy and the determined deviation further comprises the step of updating the noise estimate of the channel based on a comparison of the estimate of the total channel energy with a first threshold and a comparison of the determined deviation with a second threshold.

6. The method of claim 5, wherein the step of updating the noise estimate of the channel based on a comparison of the estimate of the total channel energy with a first threshold and a comparison of the determined deviation with a second threshold further comprises the step of updating the noise estimate of the channel when the estimate of the total channel energy is greater than the first threshold and when the determined deviation is below the second threshold.

7. The method of claim 6, wherein the step of updating the noise estimate of the channel when the estimate of the total channel energy is greater than the first threshold and when the determined deviation is below the second threshold further comprises the step of updating the noise estimate of the channel when the estimate of the total channel energy is greater than the first threshold for a first predetermined number of frames without a second predetermined number of consecutive frames having the estimate of the total channel energy less than or equal to the first threshold.

8. The method of claim 7, wherein the first predetermined number of frames further comprises 50 frames.

9. The method of claim 7, wherein the second predetermined number of consecutive frames further comprises six frames.

10. The method of claim 1, wherein the method is performed in either a mobile switching center (MSC), a centralized base station controller (CBSC), a base transceiver station (BTS) or a mobile station (MS).

11. An apparatus for suppressing noise in a communication system, the communication system implementing information transfer by using frames of information in channels, the frames of information in channels having noise which results in a noise estimate of the channel, the apparatus comprising:

means for estimating a channel energy within a current frame of information;

means for estimating a total channel energy within a current frame of information based on the estimate of the channel energy;

means for estimating a power of a spectra of the current frame of information based on the estimate of the channel energy;

means for estimating a power of a spectra of a plurality of past frames of information based on the estimate of the power of the spectra of the current frame;

means for determining a deviation between the estimate of the spectra of the current frame and the estimate of the power of the spectra of the plurality of past frames; and means for updating the noise estimate of the channel based on the estimate of the total channel energy and the determined deviation.

12. The apparatus of claim 11, further comprising means for modifying a gain of the channel based on the update of the noise estimate to produce a noise suppressed signal.

13. The apparatus of claim 11, wherein the apparatus is coupled to a speech coder which has the noise suppressed signal as an input.

14. The apparatus of claim 11, wherein the apparatus resides in either a mobile switching center (MSC), a centralized base station controller (CBSC), a base transceiver station (BTS) or a mobile station (MS) of a communication system.

15. The apparatus of claim 14, wherein the communication system further comprises a code division multiple access (CDMA) communication system.

16. The apparatus of claim 11, wherein the means for estimating a power of a spectra of a plurality of past frames of information further comprises means for estimating a power of a spectra of a plurality of past frames based on an exponential weighting of the past frames of information.

17. The apparatus of claim 16, wherein the exponential weighting of the past flames of information is a function of the estimate of the total channel energy within a current frame of information.

18. The apparatus of claim 11, wherein the means for updating the noise estimate of the channel based on the estimate of the total channel energy and the determined deviation further comprises means for updating the noise estimate of the channel based on a comparison of the estimate of the total channel energy with a first threshold and a comparison of the determined deviation with a second threshold.

19. The apparatus of claim 18, wherein the means for updating the noise estimate of the channel based on a comparison of the estimate of the total channel energy with a first threshold and a comparison of the determined deviation with a second threshold further comprises means for updating the noise estimate of the channel when the estimate of the total channel energy is greater than the first threshold and when the determined deviation is below the second threshold.

20. The apparatus of claim 19, wherein the means for updating the noise estimate of the channel when the estimate of the total channel energy is greater than the first threshold and when the determined deviation is below the second threshold further comprises means for updating the noise estimate of the channel when the estimate of the total channel energy is greater than the first threshold for a first predetermined number of frames without a second predetermined number of consecutive frames having the estimate of the total channel energy less than or equal to the first threshold.

21. The apparatus of claim 20, wherein the first predetermined number of frames further comprises 50 frames.

22. The apparatus of claim 20, wherein the second predetermined number of consecutive frames further comprises six frames.

23. A speech coder for coding speech in a communication system, the communication system transferring speech samples by using frames of information in channels, the frames of information in charmels having noise therein, the speech coder having as input the speech samples, the speech coder comprising;

means for estimating a total channel energy within a current frame of speech samples based on the estimate of the channel energy;

means for estimating a power of a spectra of the current frame of speech samples based on the estimate of the channel energy;

means for estimating a power of a spectra of a plurality of past frames of speech samples based on the estimate of the power of the spectra of the current frame;

means for determining a deviation between the estimate of the spectra of the current frame and the estimate of the power of the spectra of the plurality of past frames; and means for updating the noise estimate of the channel based on the estimate of the total channel energy and the determined deviation;

means for modifying a gain of the channel based on the update of the noise estimate to produce the noise suppressed speech samples; and means for coding the noise suppressed speech samples for transfer by the communication system.

24. The speech coder of claim 23, wherein the speech coder resides in either a mobile switching center (MSC), a centralized base station controller (CBSC), a base transceiver station (BTS) or a mobile station (MS) of a communication system.

25. The speech coder of claim 24, wherein the communication system further comprises a code division multiple access (CDMA) communication system.

26. A method of speech coder in a communication system, the communication system transferring speech signals by using frames of information in channels, the frames of information in channels having noise therein, the speech coder having as input a speech signal, the method comprising the steps of:

estimating a total channel energy within a current frame including the speech signal based on the estimate of the channel energy;

estimating a power of a spectra of the current frame including the speech signal based on the estimate of the channel energy;

estimating a power of a spectra of a plurality of past frames including speech signals based on the estimate of the power of the spectra of the current frame;

determining a deviation between the estimate of the spectra of the current frame and the estimate of the power of the spectra of the plurality of past frames; and updating the noise estimate of the channel based on the estimate of the total channel energy and the determined deviation; and modifying a gain of the channel based on the update of the noise estimate to produce the noise suppressed speech signal; and coding the noise suppressed speech signal for transfer by the communication system.

27. The speech coder of claim 26, wherein the speech coder resides in either a mobile switching center (MSC), a centralized base station controller (CBSC), a base transceiver station (BTS) or a mobile station (MS) of a communication system.

28. The speech coder of claim 27, wherein the communication system further comprises a code division multiple access (CDMA) communication system.

29. The speech coder of claim 26, wherein the speech signal is either an analog speech signal or a digital speech signal.

* * * * *